United States Patent [19]

Geddes

[11] 4,244,147
[45] Jan. 13, 1981

[54] FLOWER POT HOLDERS

[76] Inventor: Nicholas J. Geddes, 63 Scott St., Berarios, Johannesburg, South Africa

[21] Appl. No.: 949,725

[22] Filed: Oct. 10, 1978

[51] Int. Cl.³ .................... A47G 7/00; A01G 25/00
[52] U.S. Cl. .......................................... 47/39; 47/81
[58] Field of Search .................. 47/39, 9, 29, 81, 80, 47/71, 66

[56] References Cited

U.S. PATENT DOCUMENTS

| | | | |
|---|---|---|---|
| 1,297,484 | 3/1919 | Lutey | 47/71 |
| 1,342,786 | 6/1920 | White | 47/81 |
| 1,877,098 | 9/1932 | Washburn | 47/39 X |
| 2,492,152 | 12/1949 | Hollowell | 47/80 |
| 2,813,063 | 11/1957 | Bjorksten | 47/81 |
| 3,199,250 | 4/1962 | Sawyer | 47/81 X |
| 3,298,133 | 1/1967 | Courtright | 47/71 X |
| 3,315,408 | 4/1967 | Fisher | 47/9 |
| 3,753,315 | 8/1973 | Adam | 47/79 |
| 3,866,352 | 2/1975 | Herveling | 47/81 |

FOREIGN PATENT DOCUMENTS 1206304  4/1970  United Kingdom ....................... 47/39

*Primary Examiner*—Edgar S. Burr
*Assistant Examiner*—James R. Feyrer
*Attorney, Agent, or Firm*—Ladas & Parry

[57] ABSTRACT

The invention relates to a flower pot holder comprising a spun aluminium holder mounted on a vertical stand and containing water. Within the holder is an insert member suspended from the holder and carrying a flower pot. A wick dips into the water and includes a pad on the insert and on which the flower pot rests. The space between the insert member and the holder is ventilated by openings in the insert member.

3 Claims, 1 Drawing Figure

U.S. Patent      Jan. 13, 1981      4,244,147
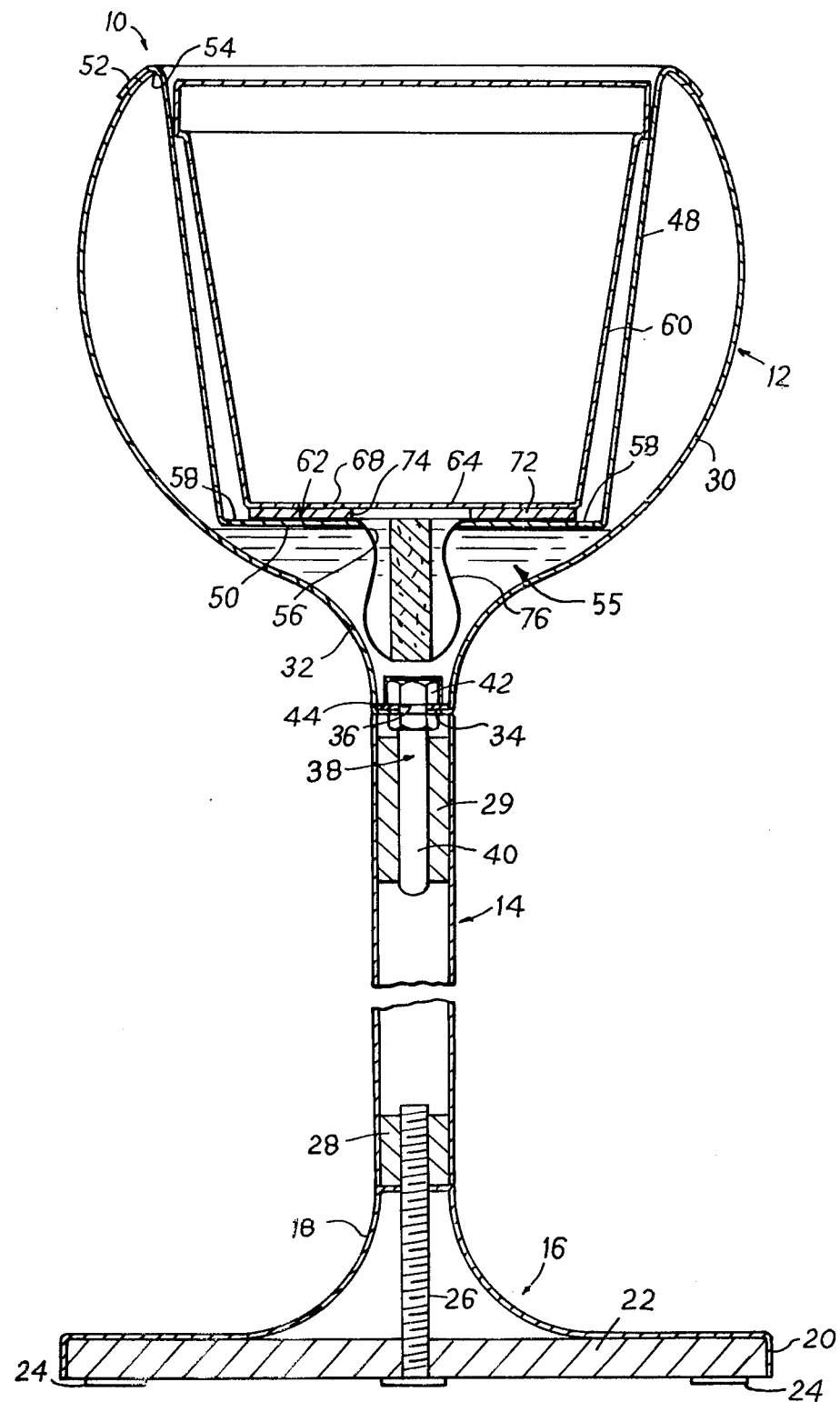

FLOWER POT HOLDERS

This invention relates to flower pot holders.

Numerous proposals have been made for containers for displaying and growing foliage. The simplest of course is a flower pot which has to be irrigated at very short intervals to feed the foliage properly. This typically required daily watering which in these times is neither practical nor can be ensured where the flower pot is used in an office environment or public place such as a church or hall. Subsequently proposals were made for self-watering devices. These include inter alia items as described in South African Pat. No. 73/1949. Such containers for displaying and growing foliage have usually served their purposes at least in the short term. However problems often occur. It is usually difficult to replenish the water and cleaning is often a problem, replacement of the foliage is often difficult. Also where aesthetically pleasing devices are provided, costs are often very substantial.

According to the present invention there is provided a flower pot holder comprising a flower pot, a water impervious body which is adapted to contain an amount of liquid, usually water, and an inner member within the body adapted to receive the flower pot and to locate it within the body above the level of liquid contained in the body.

Preferably there is additionally provided a wick carried by the inner member and adapted to dip into the water to convey dampness to a flower pot within the inner member. This wick preferably comprises a pad comprising a number of layers of acrylic capillary matting and a ribbon secured thereto and being adapted to dip into the water.

Preferably there is provided ventilating means to ventilate the space between the inner member and the body. Such ventilating means conveniently comprise openings in the inner member.

The body is preferably carried on mounting means preferably comprising a stand and an elongated support. The stand preferably includes a substantial weight at about floor level to give stability to the unit.

An embodiment of the invention will now be described with reference to the accompanying drawing which is a longitudinal section through a flower pot holder of the invention.

Referring now to the drawing, a flower pot holder 10 comprises a holder body 12 carried on an elongated vertical tubular support 14 which is mounted on a stand 16. The abovementioned parts are all made of aluminium the outer surface of which may be anodised or lacquered.

The stand 16 is a spun aluminium part having a central hollow boss 18, and a dependent rim 20. Contained within the rim 20 is a substantial disc-like weight 22 weighing about 10½ kg that gives stability to the holder 10. The weight 22 is mounted on three rubber pads 24 which carry it off the floor. The weight 22 has a central bore within which is received a metal bolt 26 that is welded to the weight and projects through the end of the boss 18.

The ends of the tubular support 14 are open. Welded into the lower end of the support 14 is a nut 28 which threadedly receives the upper end of the bolt 26. Thus the support 14 is firmly secured to the stand 16. At the upper end and slightly spaced from the end is securely received a sleeve 29.

The holder body 12 is formed as a surface of revolution based on a large diameter arc and a small diameter arc so that the body 12 has a main part spherical portion 30 merging into a narrow neck 32. This neck 32 is closed off by a flange 34 having a central aperture 36. A bolt 38 having its lower end 40 smooth passes through the aperture 36 and is received within the bore of the sleeve 28. A lock nut 42 engages the bolt 38. The nut 42 is received within the support 14 between the upper end of the sleeve 28 and the end of the support 14.

The head of the bolt 38 bears on a rubber seal 44 and is itself covered by a polyvinylchloride cap 46. Thus the lower end of the holder body 12 is water-tight.

The holder body 12 carries a spun aluminium or plastic pot holder insert 48. This insert has a frusto-conical body with a flat base 50 and a spun-over rim 52 at its upper end. This rim 52 passes through the open end 54 of the holder 12 and rests on the parts of the holder thereabout. A water receiving space 55 is provided in the body 12 below the base 50.

The insert base 50 has an enlarged central aperture 56 and a number of small openings 58 located near the body.

A plastic flower pot 60 is received within the insert 48, being supported by the insert base 50. A wick 62 (to be described more fully below) is interposed between the pot 60 and insert base 50. The flower pot 60 is a standard item of commerce and its size is chosen so that it is a reasonably close fit within the insert 48 and it has its upper edge close to below the rim 52.

The base 64 of the pot 60 has three small apertures 68 thereabout. Three low arcuate feet (not shown) are provided on the underside of the base 64.

The wick 62 comprises a pad 72 about 5 mm thick being formed of some fourteen layers of acrylic capillary matting which are needled together. The pad is annular with its outer diameter such that it fits within the feet. The pad 72 has a central opening 74, is of the same diameter as the aperture 56 in the insert base 50.

The wick 62 further comprises two rayon ribbons 76 which extend diametrically across the pad 72 at right angles thereto. The length of the ribbons 76 is such that they form central loops that lie some sixty five millemetres below the body of the pad 72 and in the water receiving space.

As mentioned above, the wick 62 is located between the bases of the pot 62 and the insert 48. It is positioned so that its central opening 74 registers with the aperture 56 of the insert base 50 and with the ribbons 76 passing through the aperture 56.

In use, the water receiving space 55 in the holder body 12 is filled with water up to the level of the insert base 50 and the pot 60 contains earth or potting mixture in which is growing suitable foliage. The ribbons 74 dip into the water 78 and convey the water to the pad 72. This quickly becomes saturated and the dampness thereof serves to dampen the potting material and thus to feed the foliage.

Periodically, sat at intervals of about one month, the pot 62 is removed from the insert 48 and the water replenished. At the same time, the wick 62 is removed for cleaning or replacement. The length of the interval between such cleaning and replenishment operations can be determined by experiment for various types of foliage and seasons of the year.

It will be noted that because of the provision of the breathing openings 58, the sides of the wick 62 will be ventilated thus preventing it from rotting. Also the water in the holder 12 will remain fresh. It will also be noted that when it is desired to clean the holder body 12, the pot 60 and insert 48 are removed and the holder body 12 can be easily withdrawn from the support 14.

The wick provides a regular and consistant dampening for the potting material—neither under or over watering this material.

The flower pot is space and labour saving. It is also aesthetically pleasing with the support 14 forming smooth continuations of the boss 18 and neck 32. The height of the foliage can be chosen by selecting the desired length of support 14. The flower pot 10 is remarkably stable due to the weight 22. The main replaceable parts, viz the pot 62 and the wick 62 are inexpensive and simple to remove and replace.

The invention is not limited to the precise constructional details hereinbefore described. For example the holder body 12 support 14 various parts may be made of different materials. The holder 12 must of course be made of a water impervious material or must be suitably lined or provided with an impervious insert.

I claim:

1. A flower pot holder comprising:
   (a) a flower pot,
   (b) a hollow body surrounding the flower pot and formed as a surface of revolution having an open mouth at its upper end and a water impervious lower part, the said water impervious lower part defining a water space within which an amount of water is contained,
   (c) an inner member having a frusto-conical main portion and a flat base at its smaller end, the main portion projecting through the mouth and being supported by the body and the base being located within the lower part of the body in such a way that the said water space is located below the said base, there being an enlarged opening in the base and in addition permanently open ventilating openings in the inner member ventilating the water space,
   (d) wick means comprising a pad of capilliary matting resting on the base and a ribbon attached to the pad and passing through the said enlarged opening, the said flower pot standing on the pad,
   (e) a weighted stand, and
   (f) an elongated upright support having upper and lower ends the lower end being connected to the stand and the upper and being connected to the body and carrying the body through a bolt passing through the lowermost part of the body and further comprising sealing means wherein the said bolt is in sealed water-tight relationship with the body, and wherein the projecting part of the bolt is received in the upper end of the said upright support.

2. A flower pot holder as claimed in claim 1 in which the projecting part of the bolt is smooth and is slidably received within a tubular sleeve carried by the upright support in its upper end.

3. A flower pot holder as claimed in claim 1, in which the wick means comprises (a) a pad comprising a number of layers of acryllic capilliary matting interposed between the base and the flower pot and (b) a rayon ribbon wick connected to the pad, dipping into the water in the water space and conveying dampness to the flower pot.

* * * * *